US008190613B2

(12) United States Patent
Takuma et al.

(10) Patent No.: US 8,190,613 B2
(45) Date of Patent: May 29, 2012

(54) SYSTEM, METHOD AND PROGRAM FOR CREATING INDEX FOR DATABASE

(75) Inventors: Daisuke Takuma, Sagamihara (JP); Issei Yoshida, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 12/132,301

(22) Filed: Jun. 3, 2008

(65) Prior Publication Data

US 2008/0319987 A1 Dec. 25, 2008

(30) Foreign Application Priority Data

Jun. 19, 2007 (JP) ................................. 2007-161524

(51) Int. Cl.
G06F 17/00 (2006.01)
(52) U.S. Cl. ........................................................ 707/741
(58) Field of Classification Search .................. 707/741
See application file for complete search history.

(56) References Cited

U.S. PATENT DOCUMENTS

| 5,742,807 | A * | 4/1998 | Masinter ...................... 707/610 |
| 5,973,692 | A * | 10/1999 | Knowlton et al. ............. 715/835 |
| 6,321,232 | B1 * | 11/2001 | Syeda-Mahmood ................ 1/1 |
| 6,553,385 | B2 | 4/2003 | Johnson |
| 6,757,675 | B2 * | 6/2004 | Aiken et al. ........................... 1/1 |
| 7,672,956 | B2 * | 3/2010 | Belakovskiy et al. ......... 707/711 |
| 7,684,975 | B2 | 3/2010 | Aoki et al. |
| 2002/0087515 | A1 * | 7/2002 | Swannack et al. ................. 707/2 |

FOREIGN PATENT DOCUMENTS

| JP | 2001-84250 | 3/2001 |
| JP | 2002-251402 | 9/2002 |
| JP | 2005-246440 | 9/2005 |
| JP | 2007-156739 | 6/2007 |

OTHER PUBLICATIONS

Issei Yoshida, et al., "Software Architecture for Interactive Text Mining" Provision, Feb. 2, 2007, vol. 14, No. 1, pp. 71-78, IBM Japan LTD.
Japan Patent Office, Notice of rejection, Jul. 14, 2009, English translation of essential part of the office action made by the Japanese examiner.
"UIMA Java Framework" downloaded from http://uima-framework.sourceforge.net/.

* cited by examiner

*Primary Examiner* — James Trujillo
*Assistant Examiner* — Kurt Mueller
(74) *Attorney, Agent, or Firm* — Gail H. Zarick; Otterstedt, Ellenbogen & Kammer, LLP

(57) ABSTRACT

A computer implemented method for creating indices for a database having a plurality of documents each being associated with one or more keywords. The method includes the steps of: dividing the database into a plurality of subsets; separating the keywords into a plurality of keyword groups based upon modulo G of the hash value of the keyword for each subset; reading each document of each subset to create a first sub-index and writing same to a storage device of the computer; reading the first sub-indices to merge the first sub-indices into a second sub-index for each keyword group to write same to the storage device; and reading the second sub-indices from the storage device to merge the second sub-indices into an index for the database and write same on the storage device. A program and a system for creating indices are also provided.

17 Claims, 13 Drawing Sheets

SYSTEM, METHOD AND PROGRAM FOR CREATING INDEX FOR DATABASE

This application claims priority under 35 U.S.C. §119 from Japanese Patent Application No. 2007161524 filed Jun. 19, 2007, the entire contents of which are incorporated herein by reference.

BACKGROUND OF THE INVENTION

The present invention relates to a database used in text mining or the like. In particular, the present invention relates to a system, method and program for creating an index for a database.

In a typical application example of text mining, it is necessary to provide a search condition to a text mining system in an interactive manner, and then find a keyword having a high correlation with the search condition.

For example, consider a case where call log records at a PC call center are analyzed as the object. In particular, a problem that frequently appears in a particular product is desired to be found in this case. A search is performed by using the product number as the search condition in this case. Then, by counting the number of keywords each appearing in the documents found by the search, keywords that are frequently mentioned with the product are found.

Moreover, in the text mining system, a category can be provided for a keyword in advance. For example, a category titled "problem expression" is provided for a keyword "heat generation." Problems can then be efficiently found by counting the number of keywords that belong to this category only.

As described above, in the application example of text mining, a search condition is provided to the text mining system in an interactive manner, and the result of the search is then verified. In such text mining, it is necessary to count the numbers of keywords in a dynamically provided document set. A relational database may be utilized as an index structure for calculating the number of keywords at high speed. However, the relational database does not provide performance sufficiently high enough to perform the correlation analysis between the search condition and the frequencies of keywords.

In this respect, as an index structure and an algorithm for executing mining at high speed to respond to such purpose, there is a technique described in Japanese Patent Application No. 2005-349717 by the present applicant. However, by use of the technique described in Japanese Patent Application No. 2005-349717, an index structure, which is proposed in the patent document, is difficult to build for large scale data. The primary reason for the difficulty is that the size of data becomes too large to be retained in the main memory. To be more precise, when the relationships between the keywords and the documents included in the text mining database are mapped in a matrix structure, the size of data becomes large. As a result of this, all the necessary information cannot be retained in the main memory as the number of documents included in the database increases.

Specifically, in more detail, in order to build an index at high speed, a map indicating the correspondence between the keyword character strings and the numeric values of IDs needs to be retained in the main memory. Moreover, in order to search by a keyword for a posting list (that is, an array of document IDs) of the documents corresponding to the keyword from data in a certain structure, the data must be also arranged in some order with respect to keywords (for example, in an order of frequency of keyword appearance). In this case as well, however, unless a hash structure having a keyword set is retained in the main memory, the merging of indices obtained by dividing the entire index in document unit basis is difficult. In this respect, it is an essential matter that the size of the main memory is large enough to maintain all the keywords required for creating an index. Accordingly, since the size can be increased to some extent only within a certain limit, the size of the main memory determines the limitation of the number of documents for which an index structure can be created in the document set.

Incidentally, in U.S. Pat. No. 6,553,385 and the UIMA Java Framework available via SourceForge, a framework is described for extracting information by applying a technique such as a natural language processing to each of the documents of the document set, and then storing the information in a predetermined data structure. This disclosed technique, however, is not one that suggests a technique to efficiently store large scale data for sequentially processing information obtained by processing one document.

Japanese Patent Application Laid-open Publication Hei 9-212528 discloses a technique including a step of dividing a database into a plurality of data segments. In this technique, the database segments respectively correspond to ranges having different values from each other in a selected field in the database. In addition, this technique includes the steps of storing each of the data segments in various storage devices; of storing a segment index for identifying each of the corresponding database segments; and of storing a range index having entries corresponding to a plurality of ranges in the selected field. Then, in this technique, each of the entries in the range index identifies the segment index corresponding to the range among the plurality of data segments.

In the technique disclosed in Japanese Patent Application Laid-open Publication No. 2003-271648, search target documents are divided into a plurality of groups, firstly, and then each of the groups, a keyword appearing in the search target documents included in this group and the number of the search target documents in which the keyword appears are stored in association with one another.

As described above, Japanese Patent Application Laid-open Publications Nos. Hei 9-212528 and 2003-271648 suggest the techniques of achieving a faster search by dividing a database into a plurality of segments and thereby balancing the loads of the processing of data in order to support a large scale search. The methods suggested in these documents, however, only relate to a database search, so that the methods cannot be applied to the creation of an index of a large scale text mining database.

SUMMARY OF THE INVENTION

It is an object of the invention to provide a system, method and program each of which allows faster creation and processing of an index of keywords included in documents of a large scale database used in a text mining system or the like, regardless of a physical limitation such as the size of the main memory of a computer or the like.

According to the present invention, the aforementioned object is achieved by the following processes. Documents of a database are divided into a plurality of document subsets, and then an index creation process is performed for each of the divided document subsets. Then, partial index files are created, and such partial index files are merged into one so as to become an index for the original entire database.

It should be noted that in the context of the present invention, a keyword indicates a general character string representing extraction information such as a word or phrase, and Documents are certain aggregation units each including several keywords. Moreover, a large scale database used in a text mining system includes a finite set of such documents. As an example of such a document unit, one phone call log at a call center, one e-mail in an e-mail database, one HTML file in Web data, one article of a blog or the like can be cited.

According to the present invention, first, the entire document set is decomposed into a sum of subsets each having no common part.

Next, for each of the subsets divided in the aforementioned process, a set of keywords appearing in the subset is categorized into groups on the basis of a remainder resulting from dividing a hash value of each of the keywords by a certain fixed integer value. Thereby, an index file for each of the groups is created. This fixed integer value is termed the number of groups, and the remainder resulting from dividing the hash value of the keyword by the number of groups is termed a group number. It should be noted that the number of groups is previously determined independently from the number of subsets obtained by dividing the entire document set.

Next, the index files, each being prepared for each of the subsets of the documents in the aforementioned manner and having the same group number, are merged. Thereby, the integrated index files corresponding to the respective group numbers are created. The number of integrated index files may be as many as the number of group numbers, and these files are not an index corresponding to the entire document set. In this respect, such integrated index files are then merged, so that an index file corresponding to the entire document set is created.

BRIEF DESCRIPTION OF THE DRAWINGS

For a more complete understanding of the present invention and the advantage thereof, reference is now made to the following description taken in conjunction with the accompanying drawings.

DETAILED DESCRIPTION OF THE PREFERRED EMBODIMENT

Figures 1, 2:
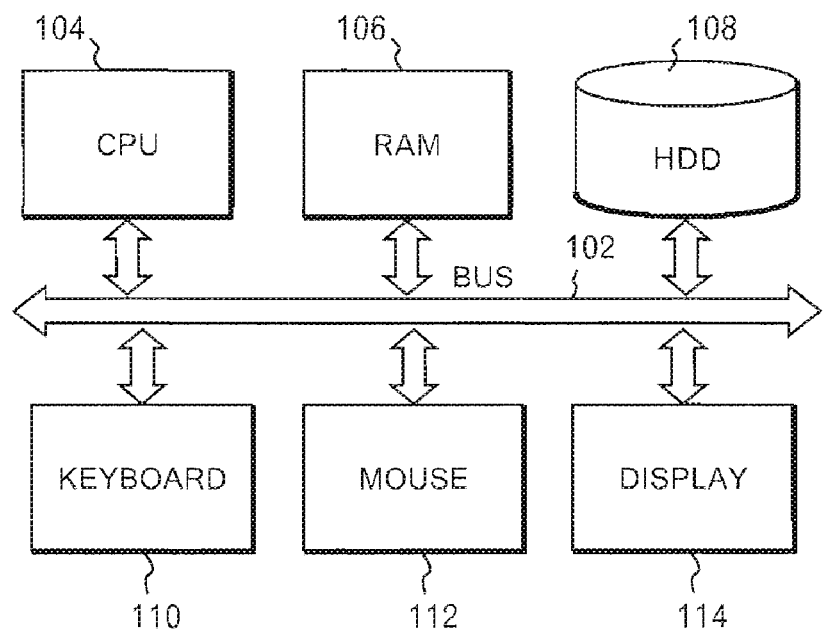
FIG. 1 is a block diagram showing a hardware configuration for implementing the present invention.
FIG. 2 is a diagram showing relationships of documents and keywords in a database.

Hereinafter, descriptions will be given of the configuration and the processing of an embodiment of the present invention with reference to drawings. In the descriptions below, unless specified otherwise, identical elements are denoted by the same reference numerals throughout the drawings. It should be noted that the configuration and the processing described herein is provided as an embodiment. Accordingly, it should be understood that the intention is not to limit the technical scope of the present invention to this particular embodiment.

FIG. 1 shows a block diagram of a computer hardware system for implementing system configuration and processing according to the example of the present invention. In FIG. 1, a CPU 104, a main memory (RAM) 106, a hard disk drive (HDD) 108, a keyboard 110, a mouse 112 and a display 114 are connected to a system bus 102. The CPU 104 is preferably one based on a 32-bit or 64-bit architecture, and Pentium (registered trademark of Intel Corporation) 4, Athlon (registered trademark of AMD., Inc.) or the like may be used, for example. The main memory 106 is preferably one having a capacity of not less than 2 GB. The hard disk drive 108 is preferably one having a capacity of not less than 200 GB for storing a large scale database for text mining and an index file of the database.

In the hard disk drive 108, an operating system and data of a large scale database for text mining are stored in advance although they are not individually illustrated. The operating system may be an arbitrary one that supports the CPU 104, including Linux (registered trademark), Windows XP (registered trademark of Microsoft Corporation), Windows (registered trademark of Microsoft Corporation) 2000, Mac OS (registered trademark of Apple Computer, Inc.) and the like.

An implementation based on arbitrary program language such as C, C++, C# or Java (registered trademark) is also stored in the hard disk drive 108. This program language implementation is used for creating and retaining a tool for the creation of an index of a database for text mining to be described below. As a program language to be used, one that supports a hash table is preferable. In particular, Java provides the functions of a hash table such as java.util.Hashtable as a library. Although the same functions as those are also provided in such implementations based on C, C++, and C#, a person skilled in this field should be able to create the functions in a case where the desired functions are not present.

The hard disk drive 108 may further include a development environment such as a text editor for writing a source code for a program compiled with the program language implementation, or Eclipse (registered trademark).

The keyboard 110 and the mouse 112 are used to start a program (not shown) that is loaded in the main memory 106 from the operating system or the hard disk drive 108 and that is then displayed on the display 114, or are used to input a letter into the system.

The display 114 is preferably a liquid crystal display, and one having arbitrary resolution such as an XGA (resolution of 1024×768), a UXGA (resolution of 1600×1200) or the like may be used. Although it is not illustrated in the drawings, the display 114 is used for displaying an operation screen of a database index creation tool according to the present invention. The process of creating a keyword is started by inputting a predetermined parameter or a file name on this screen with the keyboard 110 and then, by clicking with the mouse 112 a predetermined button displayed on the screen.

Next, a description will be given of a general structure of the database for text mining with reference to FIG. 2. As shown in FIG. 2, a database 202 for text mining includes a plurality of documents to which document ids=1, 2, 3 . . . are respectively provided. As an example of such a document unit, a log of one phone call at a call center, one e-mail in an e-mail database, one HTML file in Web data, one article in a blog or the like can be cited. In many cases, the number of documents in a database is on the order of a hundred thousand, and in some cases, more than one million documents are included in a database.

Each of the documents is associated with one or more keywords extracted from the document by a known technique in the field of text mining. Although a technique described in Japanese Patent Application Laid-open Publications No. 2001-84250, 2002-251402 and 2004-246440 is a known technique for extracting a keyword from each of the documents, the details thereof are not described herein since such technique is not the main subject of the present invention. In the example shown in FIG. 2, the keywords, phone, internet and mail are extracted from the document of id=1, and then are associated with the document of id=1, and the keywords, mail and network are extracted from the document of id=2, and are associated with the document of id=2. Here, it should be noted that a single keyword within a single document is not repeatedly counted.

Incidentally, it is to be understood that although English words are shown as the examples of keywords in FIG. 2, the application range of the present invention is not limited to any particular language since a technique to extract a keyword in Japanese or other arbitrary languages by use of a syntactic parsing technique is established.

In the current data structure, however, it takes a very long time to list the document ids of documents each including the keyword, internet, for example. In this respect, in order to make such reference faster, some indices to be described in FIG. 3 and in the drawings subsequent to FIG. 3 are necessary.

Figure 3:
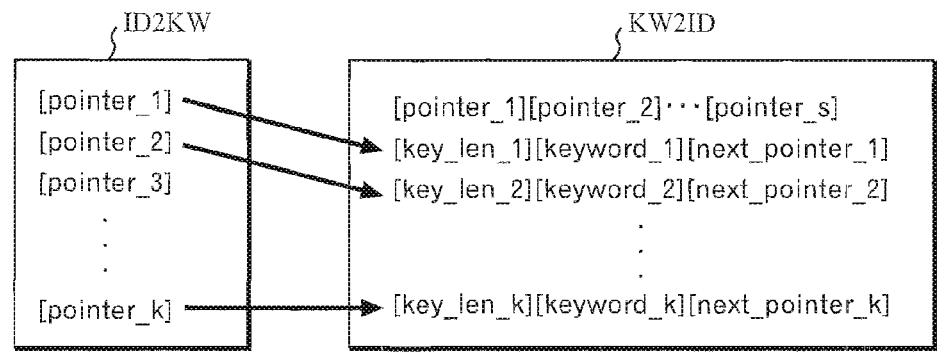
FIG. 3 is a diagram showing a structure of a KW index of a database.

Referring to FIG. 3, first, there are shown an index Keyword to ID (KW2ID) for finding a keyword id on the basis of a keyword character string, and an Index ID to Keyword (ID2KW) for finding a keyword character string on the basis of a keyword id by use of a pointer. As the data structure itself, java.util.Hashtable may be used in a case of using Java (registered trademark) as the programming language, for example.

Along with an ID (id_i) (i=1, 2, . . . , k), each of the keyword character strings is stored in keyword_i of the KW2ID table. The length of the character string of keyword_i is stored in key_len_i. For example, the value of key_len_i is 3 in a case of "CPU".

When finding a keyword id on the basis of a keyword character string w, keyword_i indicated by the value of pointer_i with respect to hash value i of the keyword character string w is searched for. In a case where keyword_i matches with the keyword character string w, keyword_i is the keyword id to be found by id_i. In a case where they do not match with each other, a different keyword indicated by next_pointer_i is searched for, and whether or not the different keyword matches with the keyword character string w is determined. This process is repeated until w is found. In a case where the value of next_pointer_i is a value indicating that the next keyword does not exist (for example, −1), the keyword character string w is determined to not be registered in the index.

When finding a keyword character string on the basis of a keyword id, pointer_i of the ID2KW is read (since each pointer_i is 8 byte fixed length, the position of pointer_i within the ID2KW can be directly found if the keyword id can be found). Then, the keyword character string keyword_i within the KW2ID, indicated by the value of the pointer_i is read.

Figure 4:
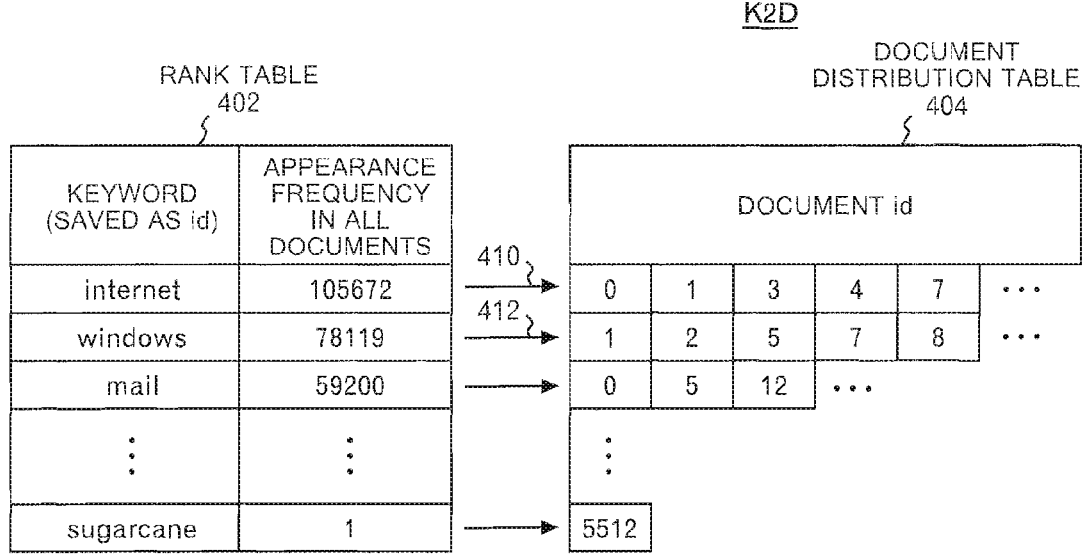
FIG. 4 is a diagram showing a structure of a keyword id to document id (K2D) index of a database.

Next, referring to FIG. 4, a description will be given of a K2D that is an index providing a pointer to a document on the basis of a keyword. In FIG. 4, a rank table 402 is a table showing the correspondences of the keywords and the appearance frequencies of the keywords in all the documents. In the rank table 402, actually each of the keywords is stored as the keyword id that is shown as keyword_i in FIG. 3, instead of being stored as a specific character string such as "internet". For example, according to FIG. 4, the keyword, "internet" appears 105672 times in all the documents. In the rank table 402, the fields of the keywords are sorted in a descending order of appearance frequency.

In a document distribution table 404, a set of document ids in each of which a keyword appears is arrayed for each of the keywords. For example, in the first row of the document distribution table 404, the document ids of documents in each of which the first keyword, "internet" appears are arrayed. It should be noted that a document id is formed of 4-byte in the preferred embodiment. Although, a document id is normally expressed by a non negative integer in many instances, in a case where an integer is represented by 4-byte using two's complement representation, values from 0 to 2147483647 can be represented. Accordingly, the document id can be represented by 4-byte in many cases. As a matter of course, there exists an implementation method that secures the greater number of bytes as appropriate.

Incidentally, each of the fields of the appearance frequencies in the rank table 402 serves as a pointer for corresponding rows of the document distribution table 404. For example, the field of the appearance frequency of the keyword "internet" is a pointer 410 and indicates {0, 1, 3, 4, 7 . . . } that is the corresponding row in the document distribution table 404. It should be noted that {0, 1, 3, 4, 7 . . . } is an arrangement of document ids each represented by a number in each of the fields of the document distribution table 404. Likewise, the field of the appearance frequency of the keyword "windows" is a pointer 412 and indicates {1, 2, 5, 7, 8 . . . } that is the corresponding row in the document distribution table 404.

Figure 5:
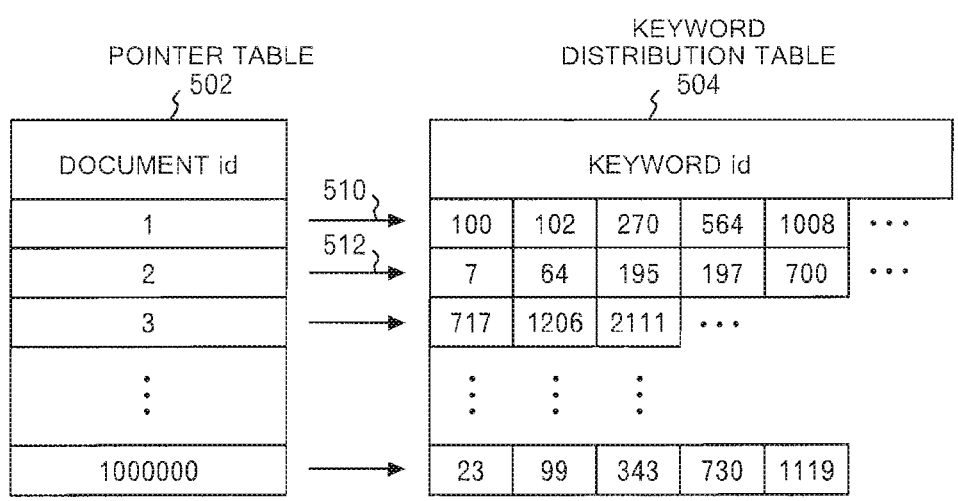
FIG. 5 is a diagram showing a structure of a D2K index of a database.

Next, referring to FIG. 5, a description will be given of a D2K that is an index providing a pointer to a keyword from a document. In FIG. 5, a pointer table 502 simply lists document ids starting from 1 to the last document id. In a keyword distribution table 504, a set of ids of keywords respectively extracted from documents is arrayed for each of the documents. For example, FIG. 5 shows that the keywords respectively having keyword ids 100, 102, 270, 564, 1008, . . . are extracted from a document whose document id is 1. Likewise, the keyword ids of the keywords extracted from a document whose document id is 2 are 7, 64, 195, 197, 700 . . . . The fields of the document ids of the pointer table 502 respectively indicate the corresponding rows of the corresponding keyword distribution table 504. For example, the field of document id 1 indicates the row that is {100, 102, 270, 564, 1008 . . . } in the keyword distribution table 504 by a pointer 510. Likewise, the field of document id 2 indicates the row that is {7, 64, 195, 197, 700 . . . } in the keyword distribution table 504 by a pointer 512. It should be noted that here, {100, 102, 270, 564, 1008 . . . } is an array of keyword ids each represented by a number in each of the fields of the keyword distribution table 504. In the preferred example, a keyword id is also formed of 4 bytes.

It should be understood that these index structures themselves as described above have been heretofore known, and are thus not features of the present invention. From here, a description of the present invention not known in the conventional technique will be provided.

In the present invention, a fixed integer value that is called a number of keyword groupsG is selected, first. This number G is used in the following manner. Specifically, a certain hash function hash is applied to an arbitrary keyword w. A remainder h obtained by dividing the result of the hash function by G and is called a group number of a keyword.

When writing these operations in a formula;

$$h = \mathrm{hash}(w) \bmod G$$

In Java notation, the formula is h=hash(w) % G.

Here, throughout the entire keywords w, whose domains are assumed, the hash function to be used here is an arbitrary one returning an integer value. For example, a function calledhashCode ( ), prepared in Java, may be used although it is not limited to this. Such function returns, by the following algorithm, a hash value for a character string having the length n.

$$s[0]*31^{\wedge}(n-1) + s[1]*31^{\wedge}(n-2) + \ldots + s[n-1]$$

Here, s[i] indicates the ith character of the character string. n indicates the length of the character string. ^ indicates exponential.

Next, a description will be given of dividing of documents of a database into plurality of subsets having a certain number of documents. According to the present invention, the entire document set D of the database is divided; D=D$_1$YD$_2$Y . . . YD$_k$ At this time, D$_i$∩D$_j$=Φ, provided that i≠j Mathematically speaking, the set D is divided in a direct sum form into D$_1$, D$_2$ . . . , D$_k$.

For example, if the database is formed of 1000000 pieces of the documents, that is, provided that, D={1, 2, . . . , 1000000}, D is divided into 20 pieces, and the results are as follows.

D$_1$={1, 2, . . . , 50000}
D$_2$={50001, 50002, . . . , 100000}
D$_3$={100001, 100002, . . . , 150000}
. . .
D$_{20}$={950001, 950002, . . . , 1000000}

In this example, the documents are divided in a manner that one subset includes 50000 documents. However, in accordance with the size of the main memory of a computer or the number of keyword groups G, a different value can be selected. Moreover, although the documents are divided into the subsets each having an equal number of documents in this example, the documents may be divided in a direct sum form into subsets each having a non equal number of documents.

Figure 6:
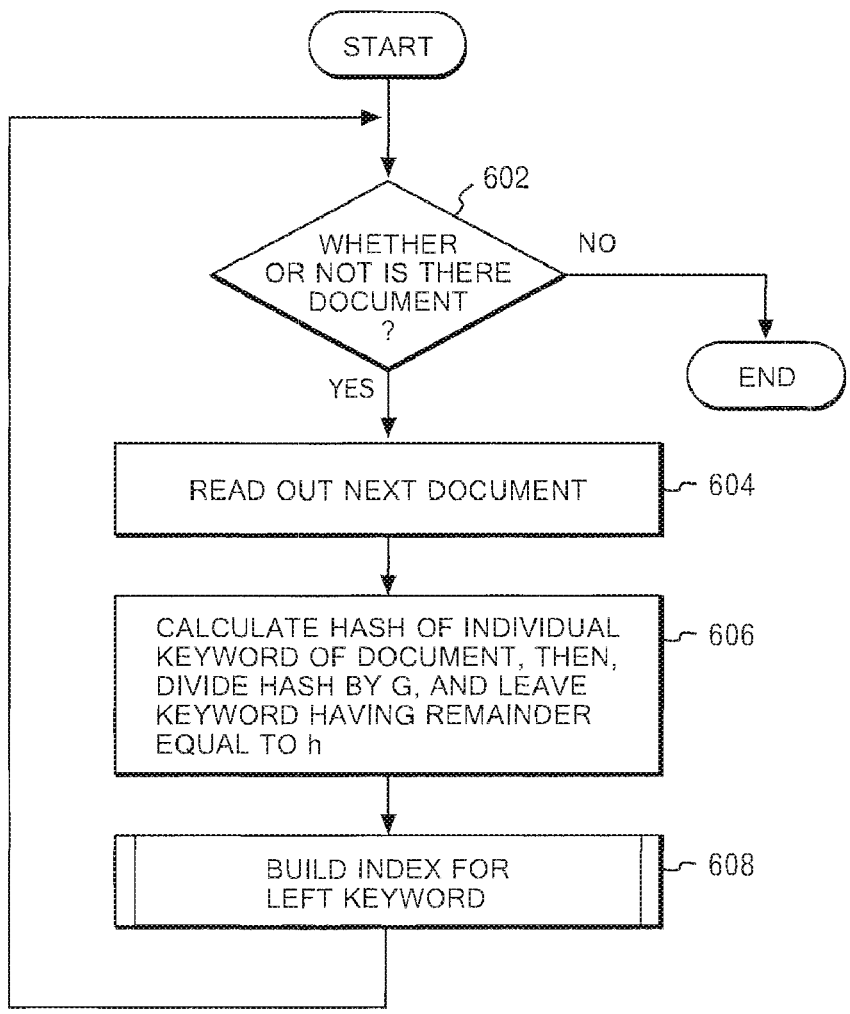
FIG. 6 is a diagram showing a flowchart for creating a partial index for a specific keyword group of a document subset.

A description will be given of a process of creating an index in one document subset with reference to the flowchart of FIG. 6. This process is a process for the hth keyword group. As mentioned above, h is the remainder of dividing the hash value of a keyword by the number of keyword groups G, h=0, 1, . . . , G−1. Accordingly, the process of the flowchart shown in FIG. 6 is thus repeated G times for one document subset while changing the value of h. It should be noted that in the following flowchart, for the sake of convenience of description, the description will be given with an assumption that a keyword group number is obtained by adding 1 to a remainder of dividing a hash value of a keyword by the number of keyword group G. Accordingly, h=1, . . . , G. Since an index of an array starts from 0 in the computer languages C or Java, h=0, 1, . . . , G−1 is more likely adapted to these computer languages. However, this becomes somewhat less intuitive, so that the assumption is made for the sake of convenience. It should be noted that it does not matter if h=0, 1, . . . , G−1 or h=1, . . . , G in an actual implementation. In a case where h= 1, . . . , G is used, a keyword belongs to keyword group 1 when the remainder of dividing the hash value for the keyword by the number of keyword groups G is 0.

First, in FIG. 6, whether there is a document that has not been read yet in the document subset is determined in step 602. If the determination made in step 602 is negative, this means that all the documents have been read, so that the process of the flowchart in FIG. 6 ends. If there is a document that has not been read yet, the next document is read from the document subset in step 604.

When one document is read out in the manner described above, a hash value is calculated for each of the keywords of the document, and furthermore, an integer division of the hash value by G is performed. When the value of the remainder is h, the keyword is retained in a predetermined buffer memory in the main memory 106 (shown in FIG. 1). When the value of the remainder is other than h, the keyword is simply ignored. As shown in FIG. 2, since a plurality of keywords are normally associated with one document, in step 606, a hash value and a remainder of dividing the hash value by G are calculated for each of the plurality of keywords associated with one document that is read in step 604. Incidentally, since all the keywords associated with one document are processed in step 606, one may consider that it is better to retain, for the later process, all the keywords in the buffer memory along with the values of the remainders of the integer divisions by G of the hash values. However, the available capacity of the main memory 106 is normally not sufficient for retaining all the keywords associated with all the documents in one document subset in the buffer memory. In this respect, according to the present invention, only the keywords belonging to one keyword group h is retained in the main memory 106.

In step 608, an index is built as to the keywords of the keyword group h retained in the buffer memory in the manner described above. Since step 608 actually includes a detailed process expressed as a subroutine, a description will be given later in detail.

Upon completion of the process of step 608, the process returns to the determination step in step 602, and repeats the steps 604, 606 and 608 so long as there is a document that has not been read yet. When all the documents are read, the determination in step 602 becomes negative. Accordingly, the process ends there. Upon completion of creating an index as to the keywords that belong to the keyword group h, the region of the main memory 106 in which the keywords that belong to the keyword group h have been retained is released. Accordingly, h is incremented by one, and the process of the flowchart of FIG. 6 starts from step 602 with the first document of the document subset.

The process of the flowchart of FIG. 6 is executed for k pieces of the document subsets, G times, eventually. As a result, the process is executed k×G times.

Figure 7:
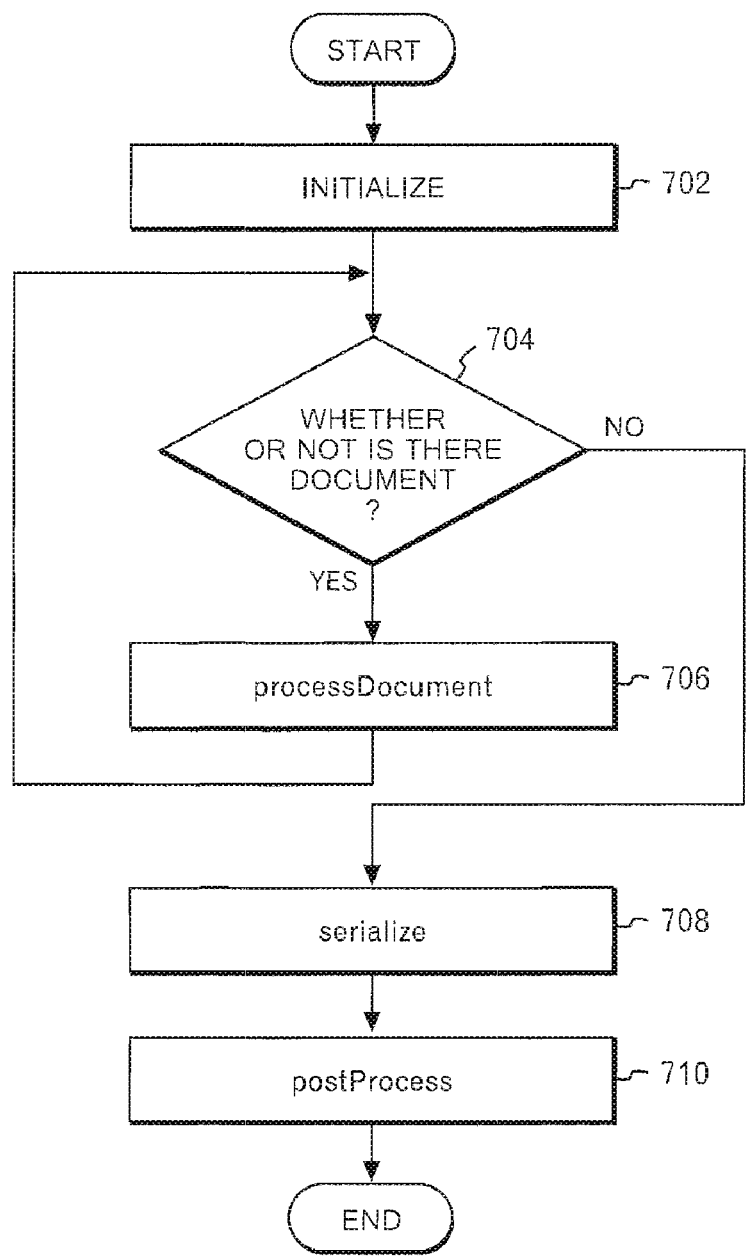
FIG. 7 is a diagram showing a flowchart of a process of a subroutine in the flowchart of FIG. 6, the subroutine being for creating an index from keywords stored in a memory.

Next, referring to FIG. 7, a description will be given of the index creation process of step 608 of FIG. 6 in detail. In step 702 of FIG. 7, an initialization process, that is, the process of reading setting information from a setting file into the main memory 106, and of opening a file in which a document is stored are performed. The setting information includes information such as a directory name for writing out an index file. It should be noted that the processing targets of the flowchart of FIG. 7 are one document subset and the keywords that belong to one keyword group h, and that are associated with the one document subset.

Describing in more detail, in the initialization step 702, three plugins including a KW plugin, a K2D plugin and a D2K plugin are initialized. Although the term, "plugin" is used, here, this may be simply understood as an individual processing part. The KW plugin is for creating the index structure shown in FIG. 3. The K2D plugin is for creating the index structure shown in FIG. 4. The D2K plugin is for creating the index structure shown in FIG. 5. Although these plugins are written in Java (registered trademark) in the preferred embodiment, these plugins can be written in another appropriate programming language such as C, C++ or C#.

In step 704, whether or not there remains a document; specifically, whether or not there remains a document to be read in one document subset is determined. When there remains a document, the process flow proceeds to step 706 termed as "processDocument." On the other hand, when all the documents have been read out, the process flow proceeds to step 708 termed "Serialize."

A description will be given of step 706 termed "processDocument." Step "processDocument" takes one document as an argument. In step 706, as to the document read out and provided as an argument, the KW plugin provides a keyword id that is unique throughout the entire document set, not throughout the document subset, to a keyword associated with the document. At this time, in step 606 of FIG. 6, the information on the keywords that belong to one keyword group h is loaded in a hash structure such as java.util.Hashtable in the main memory 106. Accordingly, the KW plugin sends a query with the keyword to the hash structure by use of a prescribed method.

At this time, if the keyword already exists in the hash structure, the keyword id of the keyword is returned. If the keyword does not exist in the hash structure, a value obtained by adding 1 to the last keyword id, that has already been provided to a certain keyword in the hash, is provided to the keyword, and then, the keyword and the keyword id are registered to the hash structure by use of a prescribed method. Moreover, the keyword id newly provided to the keyword is saved on a predetermined position of the main memory to be referable.

At this time, although a query is only made to the keywords that belong to the keyword group h, it is known that, by the calculation of the hash function and the integer division by G, the keywords itself with which the query is sent belongs to the keyword group h. Accordingly, immediately after it is found that the keyword does not exist in the hash structure related to the aforementioned keyword group h, it can be found that the keyword has not been there throughout the entire document set, and not throughout the document subset.

Thereby, the effect resulting from categorizing keywords into keyword groups is clear. Specifically, if keywords are not categorized into such keyword groups, in order to send the aforementioned query, all the keywords that have been found until that time need to be entirely loaded into the main memory 106. Such operation is difficult in many cases in view of the number of documents in the database and the size of the main memory. Moreover, in this case, the hash information of such keywords and ids needs to be once arranged in the hard disk 108, and needs to be partially read out. Accordingly, the processing speed significantly decreases in this case. According to the present invention, the entire keywords that have been found until a given time can be entirely loaded into the main memory 106 by categorizing keywords into keyword groups. The processing speed for inquiring into and providing a keyword id can thus become faster.

At this time, the KW plugin writes out the correspondences between the keywords and ids in a KW index file opened on the hard disk 108. The data structure of the KW index file is already described in relation to FIG. 3. Unlike the K2D index file (FIG. 4) and the D2K index file (FIG. 5), one KW index file is created for each of the keyword groups throughout the entire document set.

The D2K plugin causes pairs of (document id, keyword id) derived from the document provided as an argument to processDocument to be stored in the main memory 106. Here, the keyword ids that are provided by the KW plugin immediately before are used. Then, after all the documents are processed, the document keyword matrix that is one as shown in FIG. 5, and that is related to the keyword group h of the document subset is built in the main memory 106.

In processDocument, the K2D plugin does not perform any process. Then, the process flow returns to the determination in step 704.

Next, when the determination is made negative in the flowchart of FIG. 7; that is, it is determined that all the documents of the document subset have been read, in step 708 described as serialize, the D2K plugin writes out, as the D2K index file (FIG. 5), the document keyword matrix stored in the main memory 106, into the hard disk drive 108. In Serialize step 708, the KW plugin and the K2D plugin do not perform any process.

In the flowchart of FIG. 7, step 710 described as postProcess is executed after serialize step 708. In postProcess step 710, the K2D plugin receives, via the D2K plugin, the document-keyword matrix built by the D2K, then creates the matrix having transposed matrix structure (the keyword document-matrix shown in FIG. 4), and writes out the keyword-document matrix into the hard disk 108 as the K2D index file.

The creation process of the divided index file is completed at this time. In the meantime, with reference to the flowcharts of FIGS. 8 and 9, the process of creating, from the D2K index, the K2D index having a transposed matrix structure will be described as it seems better to be described in more detail.

Figure 8:
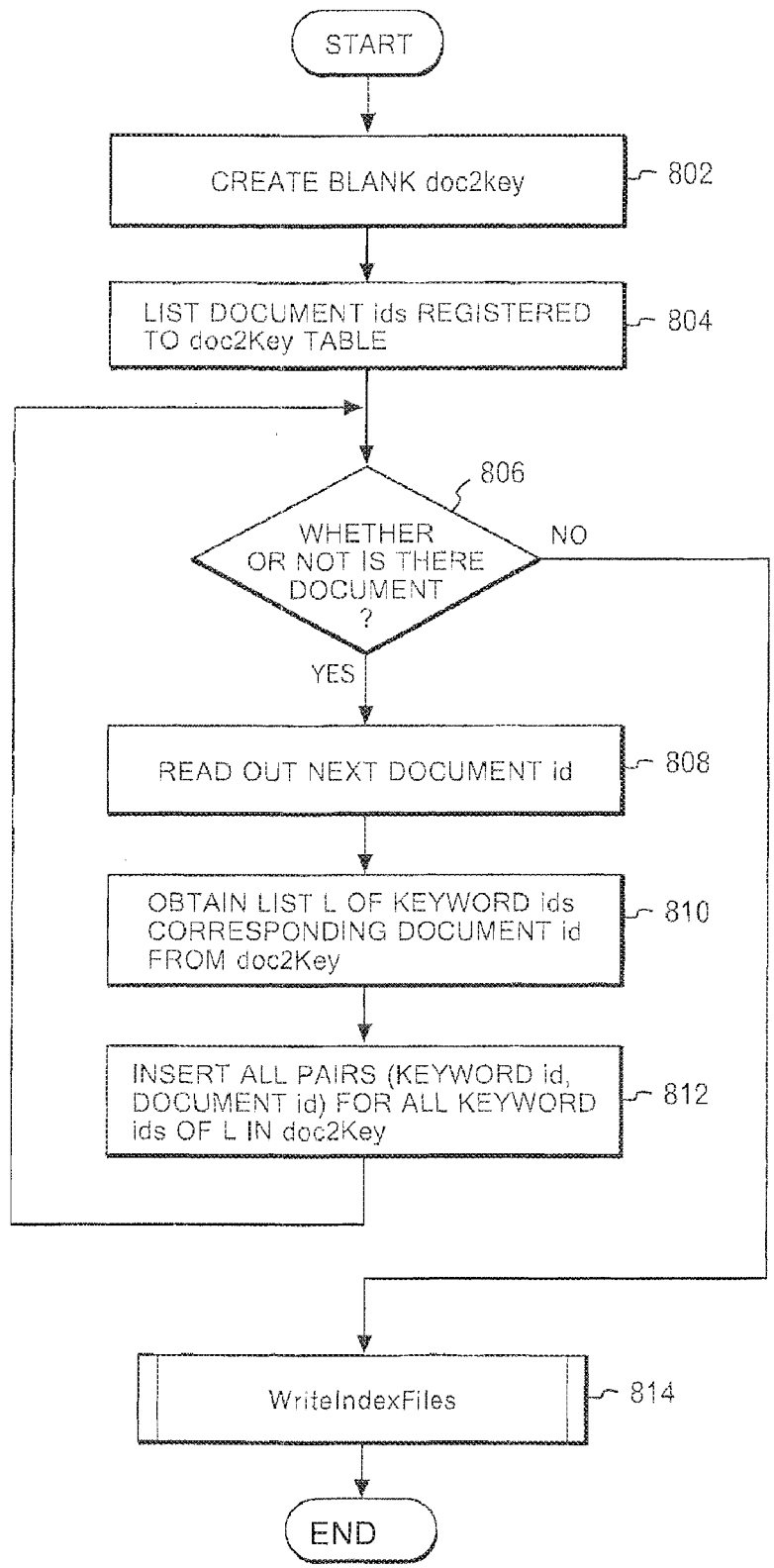
FIG. 8 is a diagram showing a flowchart of a process of creating a K2D index having a transposed matrix structure.

Referring to FIG. 8, a blank table termed as key2doc is created in step 802 by the K2D plugin. Next, in step 804, the document ids registered in the document-keyword matrix (termed as doc2key, here) built in the main memory 106 by the D2K plugin are listed. Specifically, an assumption is made that the document-keyword matrix doc2key exists in the main memory 106.

It should be noted that the doc2key itself is preferably a hash table that is created by Java and that is retained in the main memory 106. Then, the doc2key returns an array of keyword ids by using a document id as the key. The key2doc table is also preferably a hash table created by Java and returns correspondent document ids by using a keyword id as the key.

In step 806, whether or not there is a document id that has not been read out is determined. If the determination is made negative; that is, when there is a document id that has not been read out exists, the next document id is read out in step 808. In step 810, a list L (also termed as an array) of the keywords corresponding to the read out document id is obtained from the doc2key. Then, in step 812, the process of inputting, in the key2doc, each pair (keyword id, document id) for each of the keyword ids in the list L is performed. Then, the process flow returns to the determination in step 806.

When the determination made in step 806 is negative; that is, when all the document ids are read out, the process of subroutine 814 named WriteIndexFiles is performed.

Figure 9:
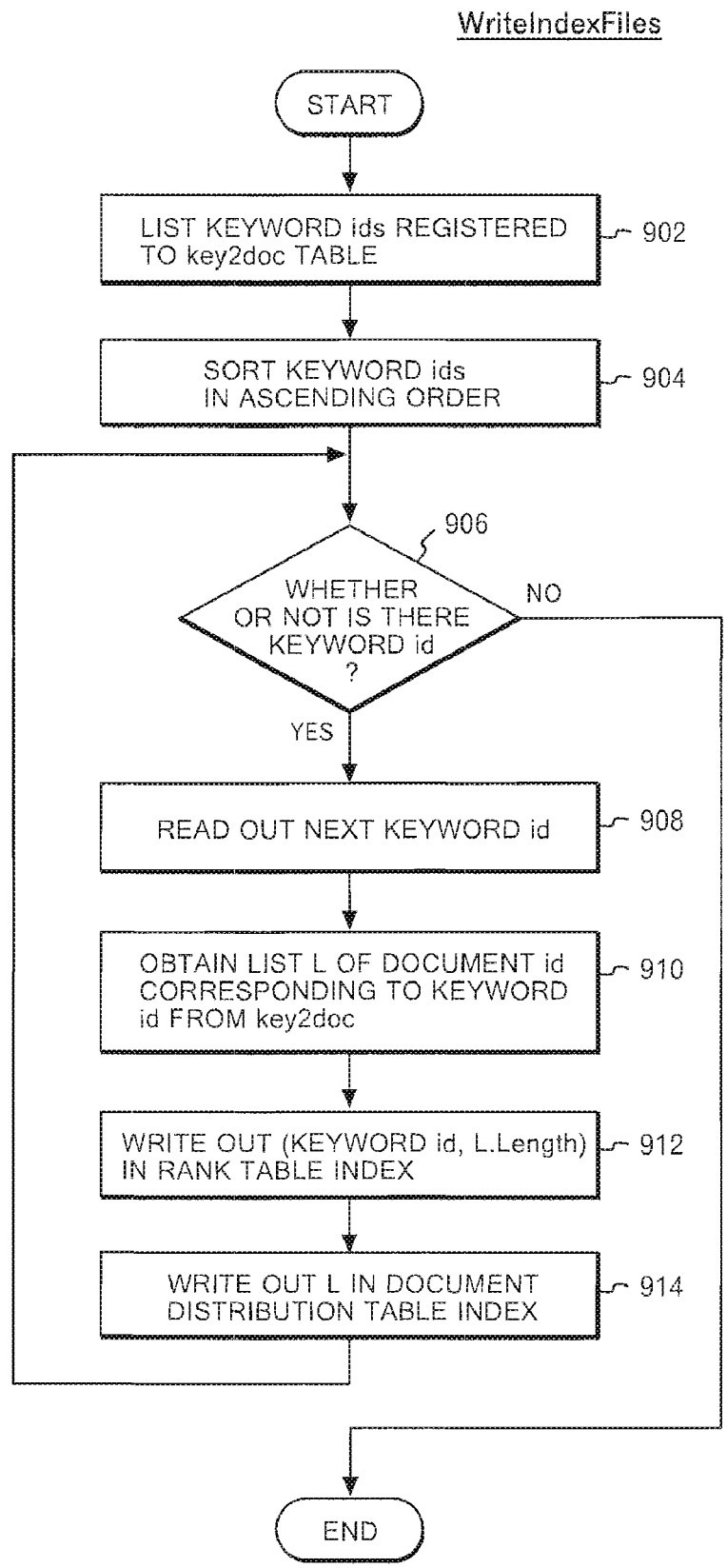
FIG. 9 is a diagram showing a flowchart of a process of a WriteIndexFiles subroutine in the flowchart of FIG. 8.

FIG. 9 shows a flowchart showing the details of WriteIndexFiles subroutine. In step 902 of FIG. 9, the keyword ids registered in the key2doc table are listed. In step 904, the keywords ids are sorted in ascending order in the list.

In step 906, whether or not there is a keyword id that has not been read out is determined. If a keyword id that has not been read out remains, the next keyword id is read in step 908.

In step 910, the list L of the document ids corresponding to the read out keyword id is obtained from the key2doc. In step 912, the pair of (keyword id, L.Length) is written out in the rank table index. It should be noted that the L.Length indicates the length of the list L. The rank table index is one that is exemplified in FIG. 4.

In step 914, the list L is written out in the document distribution table index. The document distribution table is one that is exemplified in FIG. 4.

Then, the process flow returns to the determination step of step 906, and as long as there remains a keyword id that has not been read out, the steps 908, 910, 912 and 914 are repeated. When the determination made in step 906 is negative; that is, when it is determined that all the keyword ids have been read out, the process flow is completed.

As described above, the description of the process of creating the D2K index file (FIG. 5) and the K2D index file (FIG. 4) for each of the keyword groups of each of the document subsets is completed here. Next, a description will be given of the processes of integrating these individual indices and then of creating an index corresponding to the entire document set. Incidentally, it should be understood that although a KW index file is also created in the process shown in the flowchart of FIG. 7, in the preferred embodiment of the present invention, it is not necessary to merge the KW index file into the index since this KW index file is originally created as a single index file corresponding to the entire document set.

Next, referring to FIG. 10, a description will be given of a merging process of the D2K indices, each of which is created for each of the document subsets in the keyword group h(h= 1 . . . G). In step 1002 of FIG. 10, intermediate doc2key index files $D_h[1]$, $D_h[2]$, . . . , $D_h[k]$ are opened. Here, k is the number of document subsets. $D_h[i]$ is a D2K index file for the keyword group h of the document subset Di, for example. The process of creating a D2K index file has already been explained in relation to the flowchart of FIG. 7.

Next, in step 1004, a blank index file FMD[h] is created. In next step 1006, it is set that the variable i=1, and in step 1008, whether or not i has reached k is determined. In a case where i has not reached k yet, whether or not there remains in $D_h[i]$ a document id that has not been read yet is determined.

If the determination is affirmative, the next document id is read from $D_h[i]$ in step 1012. Then, the list L of the keyword ids for the read document id is obtained from $D_h[i]$. Next, in step 1014, each pair (keyword id, document id) is written out in FMD[h] for each of the keyword ids in the list L. Thereafter, the process returns to the determination step 1010.

When it is determined in step 1010 that all the document ids in $D_h[i]$ have been read, i is incremented only by 1 in step 1018, and then, the process flow returns to the determination step 1008. Here, when i exceeds k, the process is completed, and when i does not exceed k, the process flow proceeds to the determination step 1010.

Figure 10:
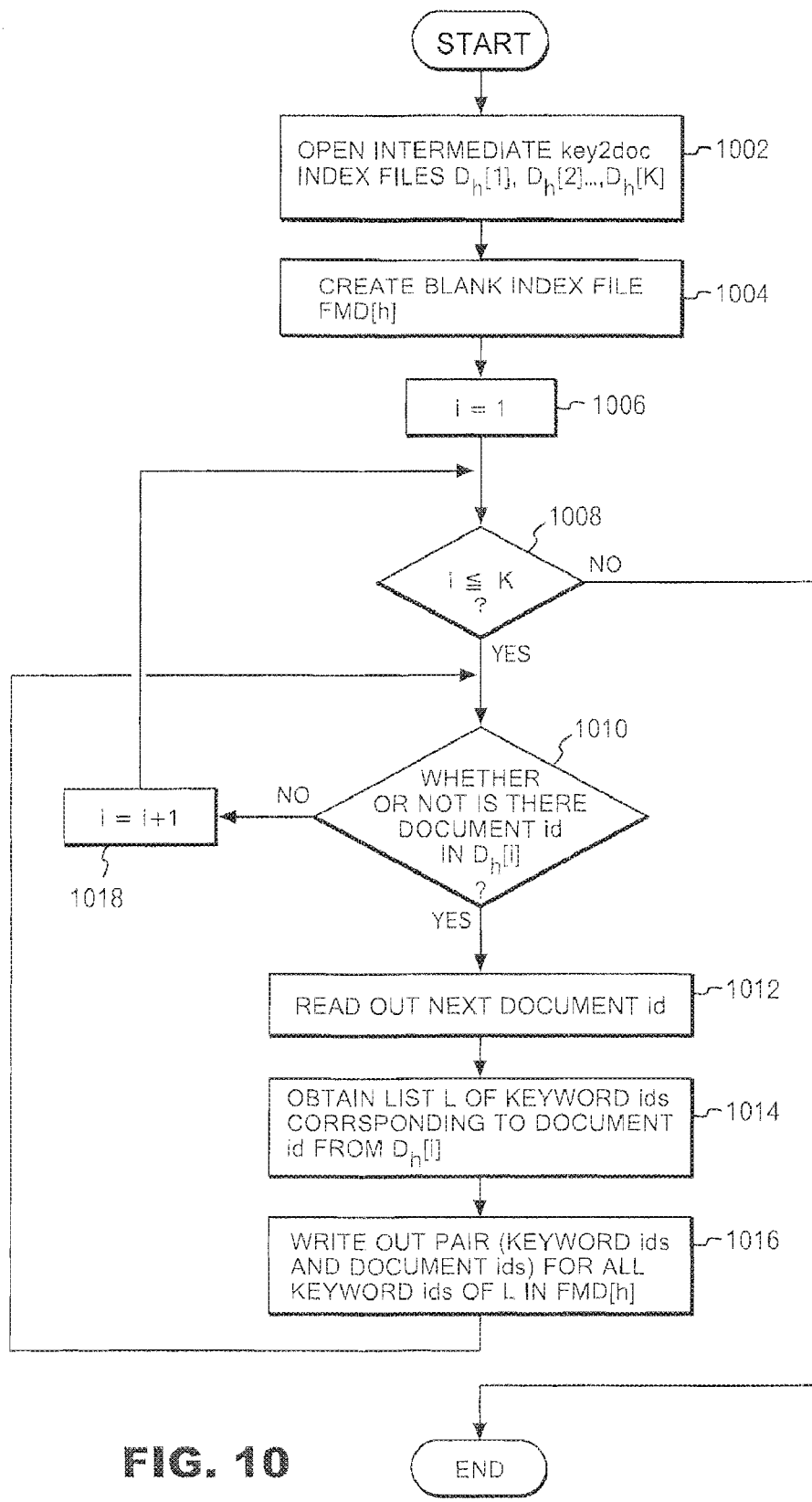
FIG. 10 is a diagram showing a flowchart of a merging process of Document id to Keyword id (D2K) indices, each of which is created for each document subset.

The flowchart of FIG. 10 is the process of creating the intermediate D2K index file FMD[h] for a single keyword group. Accordingly, by performing G times of the processes for keyword groups from the keyword group 1 until the keyword group G according to the flowchart of FIG. 10, G pieces of the intermediate D2K index files, FMD[i] (i=1, 2, . . . G) are created.

Next, referring to the flowchart of FIG. 11, a description will be given of the process of creating the final D2K index file. It should be again noted that the D2K index file is substantially formed of a pointer table (PT) and a keyword distribution table (DT) as shown in FIG. 5.

Figure 11:
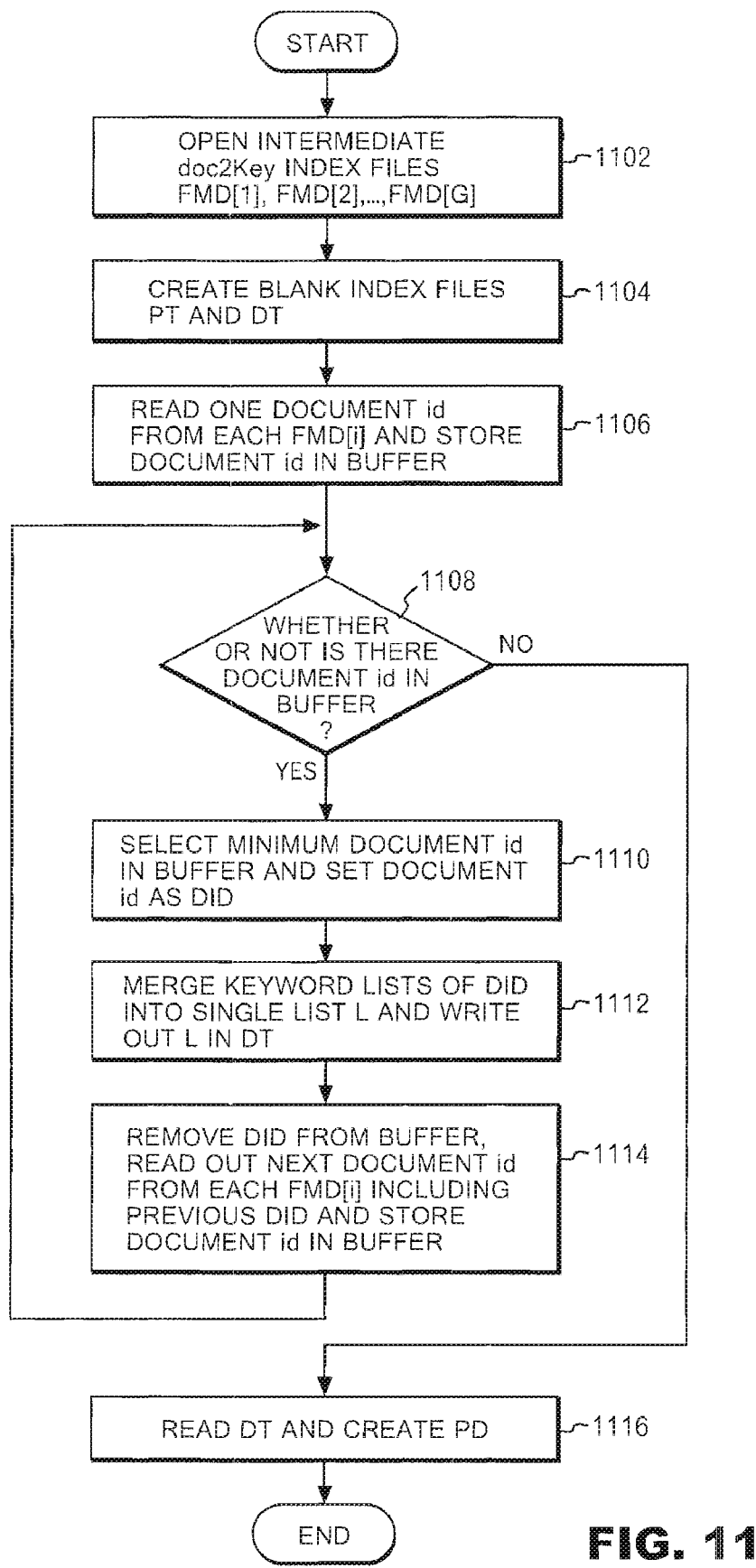
FIG. 11 is a diagram showing a flowchart of creating the final D2K index file.

Referring to FIG. 11, the intermediate doc2key index files FMD[1], FMD[2], . . . , FMD[G] are opened in step 1102. These files are created by the process described with the flowchart of FIG. 10.

In step 1106, there is performed a process of reading one document id from each of FMD[i] (i=1, 2, . . . G) in ascending order of document id, and then of storing the document ids in a buffer. This buffer in this case refers to a predetermined region secured in the main memory 106.

Next, in step 1108, whether or not there is a document id that has not been read in the buffer is determined. If there is a document id, the flow process proceeds to step 1110. In step 1110, the minimum document id stored in the buffer is selected, and is set to DID, temporarily. The minimum document id is assigned to the variable termed as DID, for example.

In step 1112, the keyword lists corresponding to the DID are obtained from FMD[i] including the DID among FMD[i] (i=1, 2, . . . G) Here, a plurality of FMD[i] each including the DID may exist. And then, the obtained keyword lists are merged into the single list L. The list L created in this manner is written out in DT.

In step 1114, DID is removed from the buffer. To be more precise, the entry of a document id having the value of DID is removed. Then, there are performed the processes of reading out next document ID in ascending order of document id from FMD[i] including the removed DID (a plurality of FMD[i] including the DID may exist), and then of storing the document id in the buffer.

As described above, steps 1110, 1112 and 1114 are repeated until the entry of a document id stored in the buffer no longer exists. Then, the process flow proceeds to step 1116 when the determination in the determination step 1108 becomes negative since the entry of a document id stored in the buffer no longer exists.

In step 1116, a PT is created by the process of reading DT sequentially from the top and then of simply recording the locations where the document ids are found.

Next, referring to FIG. 12, a description will be given of a merging process of K2D indices, each of which is created for each of the document subsets in the keyword groups h (h= 1 . . . G). First, in step 1202, intermediate key2doc index files $R_h[1]$, $D_h[1]$, . . . , $R_h[k]$ and $D_h[k]$ are opened. Here, k is the number of document subsets. $D_h[i]$ is a document distribution table (FIG. 4) for the keyword groups h of the document subset Di. Furthermore, $R_h[i]$ is a rank table (FIG. 4) for the keyword groups h of the document subset $D_i$. The process of creating $D_h[i]$ and $R_h[i]$ is already described in relation to the flowchart of FIG. 7. It should be noted that the symbol $D_h[i]$ is also used in FIG. 10, and $D_h[i]$ in this case represents an intermediate doc2key for each of the document subsets in the keyword groups h. However, the symbol $D_h[i]$ is used as the file name of a temporarily variable in each of FIGS. 10 and 12, so that it is considered that there is no confusion in using the symbol $D_h[i]$ here.

In step 1204, blank index files FMR[h] and FMD[h] are created. In step 1206, one keyword id is read from each $R_h[i]$ and the read keyword ids are stored in the buffer. This buffer refers to a predetermined region secured in the main memory 106. In step 1208, whether or not there remains a keyword id in the buffer is determined. If there remains a keyword id, the process flow proceeds to step 1210.

In step 1210, among the keyword ids stored in the buffer, the minimum keyword id is selected and the process of setting the selected keyword id as KID is performed. In the actual process, the value of the minimum keyword id is assigned to the variable termed as a KID.

In step 1212, the appearance frequencies of the KID in $R_h[i]$ including the KID are totaled. A plurality of such $R_h[i]$ may exist. Then, the KID and the total appearance frequency of the KID are written out in FMR[h].

In step 1214, the lists of the document ids corresponding to the KID and obtained from $R_h[i]$ are merged into the single list L, and the list L is written out in FMD[h].

In step 1216, the KID is removed from the buffer, and the next keyword id read out from all $R_h[i]$ that include the removed KID, and then, the next keyword id are stored in the buffer. Then, the process flow returns to the determination step 1208, and as long as there remains a keyword id in the buffer, the steps 1212, 1214 and 1216 are repeated.

When a keyword id no longer exists in the buffer, and the determination in the determination step 1208 thus becomes negative, the process flow is completed. The indices FMR[h] and FMD[h] both created by this merging process are in completely the same format as that of an input index. At this point, the keywords are arranged in ascending order of keyword id and not arranged in descending order of appearance frequency. The sorting of the data included in these indices in the order of appearance frequency is performed in the next process (process shown in the flowchart of FIG. 13).

Figure 12:
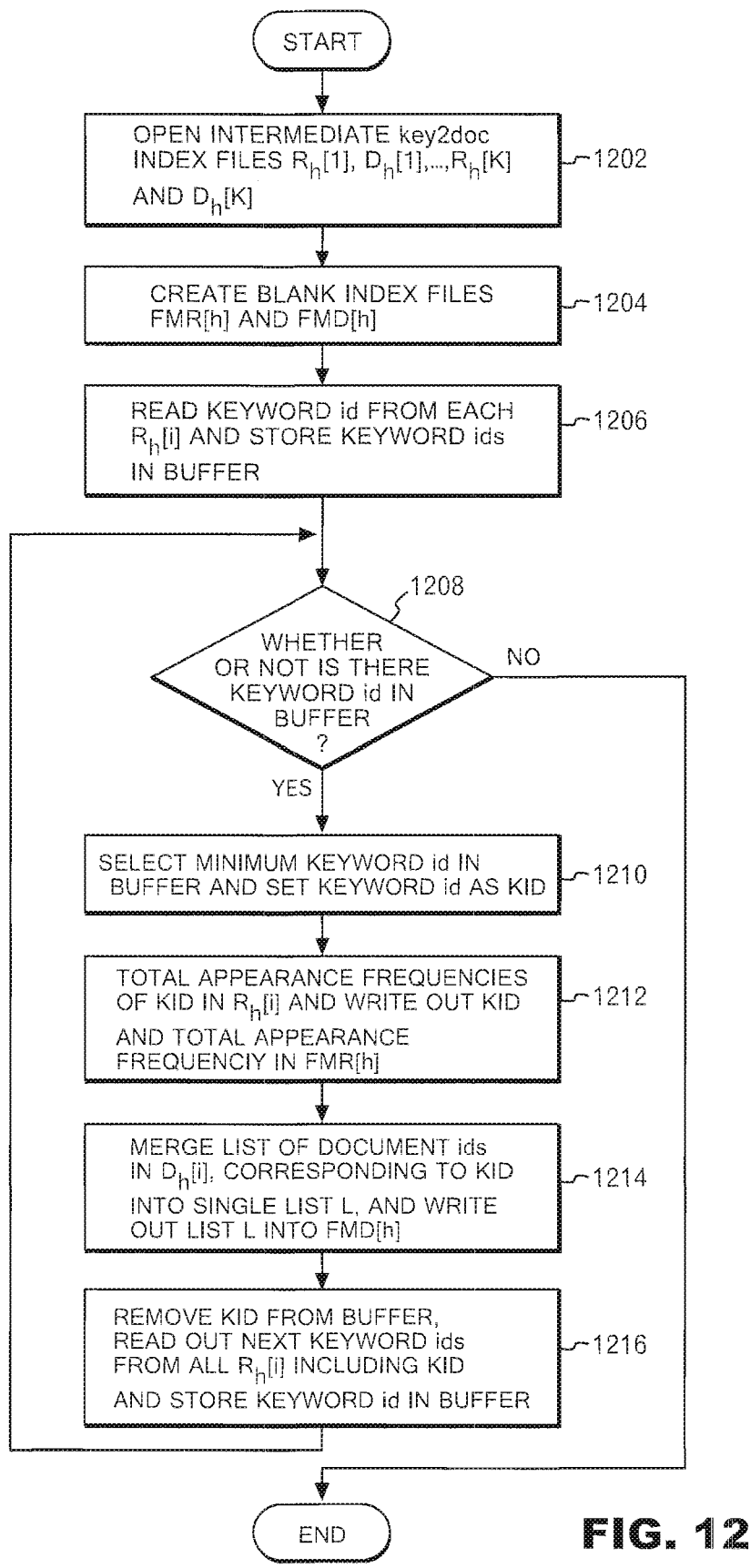
FIG. 12 is a diagram showing a flowchart of a merging process of K2D indices, each of which is created for each document subset.

The flowchart of FIG. 12 is the process of creating the intermediate K2D index files FMR[h] and FMD[h] for a single keyword group h. Accordingly, G pieces each of the intermediate K2D index files, FMR[i] (i=1, 2, . . . G) and FMD[i] (i=1, 2, . . . G) are created by performing G times of the processes for keyword groups from the keyword group 1 till the keyword group G, according to the flowchart of FIG. 12.

Figure 13:
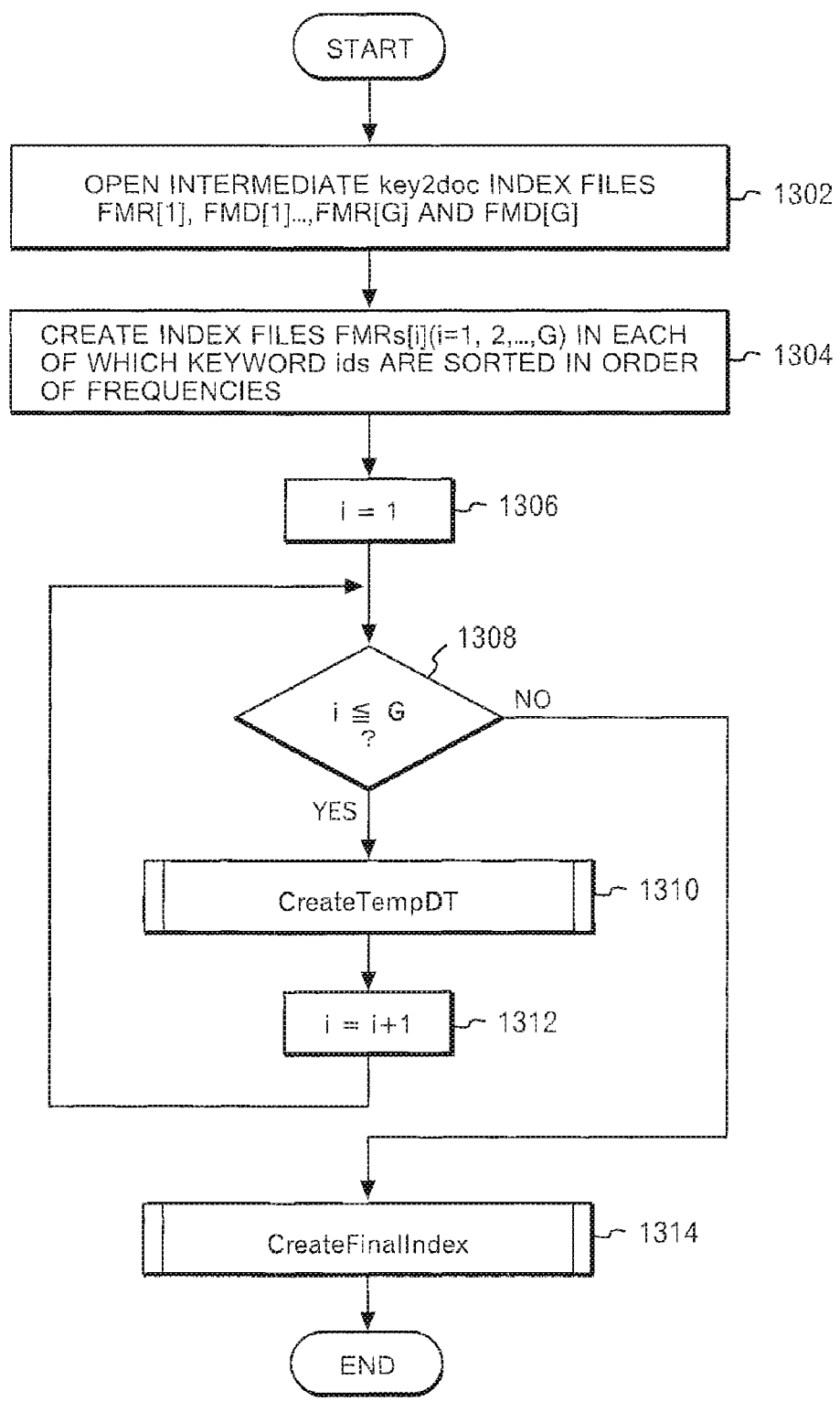
FIG. 13 is a diagram showing a flowchart of a process of creating the final K2D index file corresponding to the entire document set.

FIG. 13 is a flowchart showing the process of creating the final K2D index file corresponding to the entire document set from the intermediate K2D index files, FMR[i], FMD[i] (i=1, 2, . . . G) that are created by the process of the flowchart of FIG. 12. FMR[i] corresponds to the rank table shown in FIG. 4, and FMD[i] corresponds to the document distribution table 404 shown in FIG. 4.

In step 1302 of FIG. 13, the intermediate key2doc index files FMR[1], FMD[1], FMR[2], FMD[2], . . . , FMR[G], and FMD[G] are opened.

In step 1304, an index file FMRs[i] in which the included data are sorted in order of appearance frequency of keyword id is created from FMR[i]. This process is performed on FMR[i] (i=1, 2, . . . , G). According to the present invention, since FMR[i] is created so as to correspond to a single keyword group i, the size of a single FMR[i] is small enough be entirely stored in the main memory 106. Accordingly, this sorting process can be performed in the main memory at high speed. As to the algorithm of sorting, a known sort algorithm such as quick sort or shell sort may be used.

In step 1306, 1 is assigned to the variable i. In the determination step 1308, whether or not the variable i exceeds the number of keyword groups G. When the variable i does not exceed the number of keyword groups G, a subroutine 1310 named CreateTempDT is executed, and then i is incremented by only 1 in step 1312. Then, the determination in step 1308 is made.

In step 1308, when it is determined that i exceeds G, a subroutine 1314 named CreateFinalIndex is executed. Then the process of creating the final K2D index file is completed.

Since the description provided up to this point does not completely cover the description of the final index creation, descriptions will be respectively given of the subroutine CreateTempDT shown in step 1310 and the subroutine CreateFinalIndex shown in step 1314.

Figure 14:
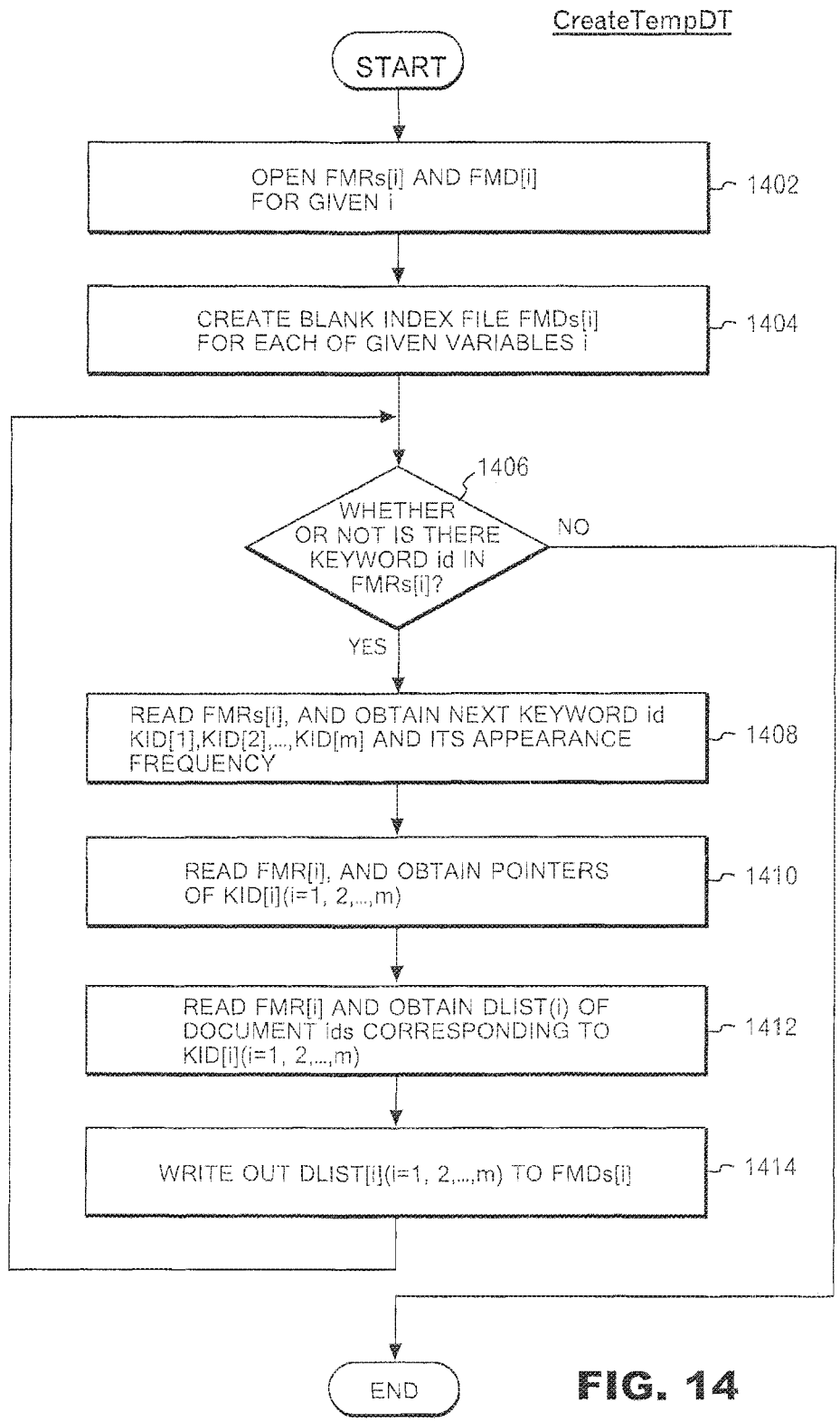
FIG. 14 is a diagram showing a flowchart of a process of a subroutine CreateTempDT in FIG. 13.

FIG. 14 is a flowchart showing the process of the subroutine CreateTempDT. In step 1402 of FIG. 14, FMR[i], FMRs[i] and FMD[i] are opened for each of the given variables i. This given variable i is provided in step 1306 of the flowchart of FIG. 13, and then, is incremented in step 1312. Moreover, FMR[i], FMRs[i] and FMD[i] are the same as the ones provided in the flowchart of FIG. 13.

In step 1404, a blank index file FMDs[i] is created for each of the aforementioned given variables i. In step 1406, whether or not there is a keyword id in FMRs[i] that has not been read yet is determined.

Then, if there is a keyword id in FMRs[i] that has not been read yet, the process flow proceeds to step 1408. In step 1408, FMRs[i] is read, and then the next keyword ID (KID[1], KID[2], . . . , KID[m]) and the appearance frequency of keyword id are obtained.

In step 1410, FMR[i] is read, and a pointer of KID[j] (j=1, 2, . . . m) is obtained. In next step 1412, FMD[i] is read, and then a list DLIST[j] of document ids corresponding to KID[j] (j=1, 2, . . . m) is obtained.

In step 1414, the process of writing out DLIST[j] (j=1, 2, . . . m) in FMDs[i] is performed. Then, the process flow returns to the determination step 1406. Then, as long as there is a keyword id in FMRs[i] that has not been read yet, the steps 1408, 1410, 1412 and 1414 are performed. When it is determined that all the keyword ids have been read out from FMRs[i], the subroutine CreateTempDT is completed.

As described above, the subroutine CreateTempDT writes out FMDs[i] for each of the given variables i. Accordingly, in FIG. 13, at the time point after the step 1312 for i=1, 2, . . . , G is completed and immediately before the step 1314, that is, at the time point after the process of the subroutine CreateTempDT is completed for i=1, 2, . . . , G and immediately before the subroutine CreateFinalIndex is called, the entire FMDs[i] (i=1, 2, . . . , G) is completed.

Figure 15:
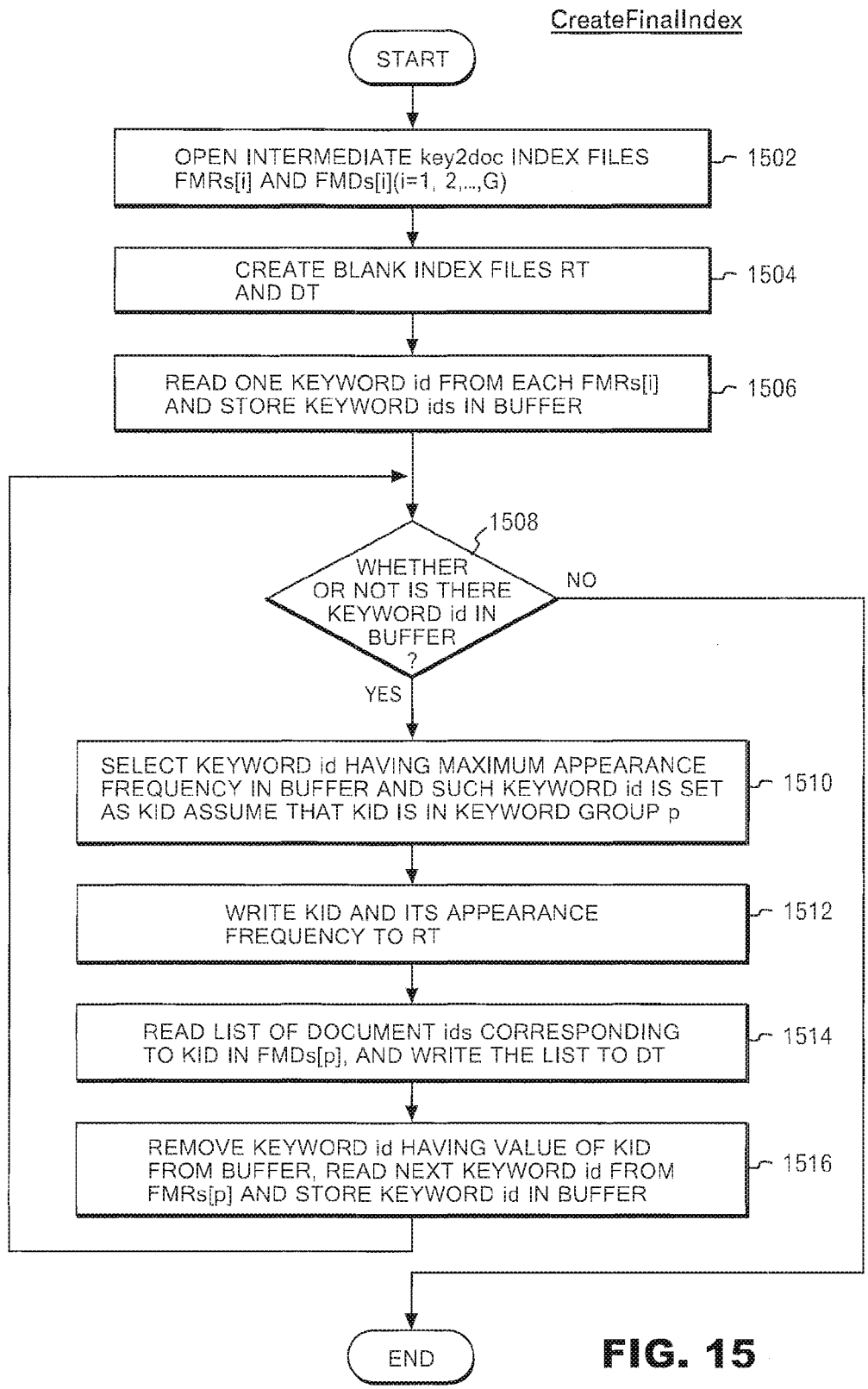
FIG. 15 is a diagram showing a flowchart of a process of a subroutine CreateFinalIndex in FIG. 14.

FIG. 15 is a flowchart showing the process of subroutine CreateFinalIndex. In step 1502 of FIG. 15, the intermediate key2doc index files FMRs[i] and FMDs[i] (i=1, 2, . . . , G) are opened. In step 1504, blank index files RT and DT are created.

In step 1506, one keyword id is read out from each FMRs[i] (i=1, 2, . . . , G), and then the keyword ids are stored in the buffer. Then, in step 1508, whether or not there is a keyword id in the buffer is determined.

When there is a keyword id in the buffer, the process flow proceeds to step 1510, and then a keyword id having the maximum appearance frequency in the buffer is selected there. The value of such keyword id is assigned to the value of the variable called KID, and then a keyword group p to which KID belongs is checked. This keyword group p is checked by examining the value of i of the FMRs[i] from which the keyword id having the value of KID is taken.

In step 1512, KID and the frequency thereof are written out in RT. In next step 1514, a list of document IDs corresponding to KID is read out in FMDs[p], and then the list is written out in DT.

In next step 1516, the keyword id having the value of KID is removed from the buffer, and the next keyword id is read out from FMRs[p] and is then stored in the buffer. Then, the process returns to the determination step 1508.

As long as a keyword id remains in the buffer in step 1508, the steps 1510, 1512, 1514 and 1516 are repeated. Then, when a keyword id no longer exists in the buffer, the flowchart of FIG. 15 ends. In the above described manner, the final index files RT and DT (respectively shown as the rank table 402 and the document distribution table 404 in FIG. 4) each corresponding to the entire document set are written in the hard disk drive 108.

Although the present invention has been described on the basis of one embodiment, one key point of the invention is to allow an index creation process to be performed faster by first categorizing keywords into a plurality of keyword groups, and thereby, retaining the entire KW index for each of the keyword groups in the main memory during the index creation process.

To put it the other way around, in a case where there is a large number of keywords associated to the database, the size of a KW index for each of the keyword groups is reduced by increasing the number of keyword groups. Accordingly, the entire keyword index KW for each of the keyword groups is made to fit in the main memory.

Such reduction in size of a partial index allows effective loading to the main memory to be performed in the merging process of index files, and thereby allows the D2K and K2D merging processes to be easily performed.

When attempting to reduce a size of an appropriate partial index file other than D2K and K2D, there is a case where reduction in size of a document subset is effective. Thereby, the flexibility in the index file creation is enhanced by utilizing two adjustment parameters that are the size of a document subset and the number of keyword groups.

According to the present invention, the entire document set is divided, and then, in each of the divided subsets, the processes are performed on parts further segmented on the basis of the concept of the number of groups based on the keywords. Then, a partial index is created in a unit of segmented part. Thereby, all the keyword data for creating an index can be loaded even in a limited capacity of the main memory and thus be processed at high speed. Furthermore, since the process of creating an integrated index file to be performed thereafter does not require a large amount of the capacity of the main memory, it is possible to obtain an obvious effect that allows the creation of an index for a database of a large scale text mining system even by a computer system having the limited capacity of the main memory.

It should be understood that the aforementioned embodiment is described in relation to a text mining database in which keywords are extracted from one document by a technique such as a structure analysis and are then associated with the document. However, it should be understood that the index creation technique of the present invention can be applied to an arbitrary database as long as the database is of a type in which keywords are associated with one document.

What is claimed is:

1. A computer implemented method for creating an overall index for a database having a plurality of documents, each of said documents being associated with one or more keywords, said method comprising the steps of:

selecting a number of keyword groups, designated as G, G comprising a fixed integer value;

dividing said database into a plurality of subsets of said documents;

for a first one of said keyword groups and for each one of said documents in a first one of said subsets of said documents, for each given one of said keywords in a given one of said documents in said first one of said subsets of said documents:

determining a remainder, h, when a hash function is applied to said given one of said keywords and a result of said hash function is divided by G, said hash function returning an integer value;

comparing said remainder, h, to a corresponding value for said first one of said keyword groups;

if said remainder, h, matches said corresponding value for said first one of said keyword groups, retaining said given one of said keywords in a main memory of said computer; and if said remainder, h, does not match said corresponding value for said first one of said keyword groups, ignoring said given one of said keywords;

building and writing to a persistent storage unit of said computer one of a set of first partial index files, corresponding to said first one of said keyword groups and said first one of said subsets of said documents, for those of said keywords retained in said main memory, and releasing said main memory;

repeating said determining, comparing, respective retaining or ignoring, and building and writing steps for all remaining ones of said keyword groups in said first one of said subsets of said documents, and for all of said keyword groups in all remaining ones of said subsets of said documents, to obtain remaining ones of said set of first partial index files;

merging each of said first partial index files corresponding to a given one of said keyword groups into one of a plurality of second partial index files, one for each of said keyword groups;

merging said plurality of second partial index files into said overall index for said database; and storing said overall index in said persistent storage unit of said computer.

2. The method according to claim 1, wherein the individual documents and the keywords of the database are provided with identifiers for documents and keywords, respectively, each of the document identifiers and each of the keyword identifiers being unique throughout the database.

3. The method according to claim 2, wherein each of the first partial index files includes a keyword to document index having a pointer from one of the keyword identifiers to one or more of the corresponding document identifiers.

4. The method according to claim 2, wherein each of the first partial index files includes a Document to Keyword index having a pointer from one of the document identifiers to one or more of the corresponding keyword identifiers.

5. The method according to claim 2, further comprising the additional steps of:

creating keyword indices each indicating a correspondence of a given keyword and a corresponding one of the keyword identifiers, and writing the keyword indices in the persistent storage unit of said computer.

6. The method according to claim 5, wherein the keyword indices are sequentially written one by one as a single keyword index file, corresponding to the database, for each of the keyword groups, by sequentially reading out the individual documents of the document subsets.

7. An article of manufacture comprising a computer program product for creating an overall index for a database having:

a plurality of documents, each of said documents being associated with one or more keywords, and a number of keyword groups, designated as G, G comprising a fixed integer value, said computer program product comprising:

a tangible computer-readable storage medium, storing in a non-transitory manner computer readable program code, the computer readable program code comprising:

computer readable program code configured to divide said database into a plurality of subsets of said documents;

computer readable program code configured to, for a first one of said keyword groups and for each one of said documents in a first one of said subsets of said documents, for each given one of said keywords in a given one of said documents in said first one of said subsets of said documents:

determine a remainder, h, when a hash function is applied to said given one of said keywords and a result of said hash function is divided by G, said hash function returning an integer value;

compare said remainder, h, to a corresponding value for said first one of said keyword groups;

if said remainder, h, matches said corresponding value for said first one of said keyword groups, retain said given one of said keywords in a main memory of said computer; and if said remainder, h, does not match said corresponding value for said first one of said keyword groups, ignore said given one of said keywords;

computer readable program code configured to build and write to a persistent storage unit of said computer one of a set of first partial index files, corresponding to said first one of said keyword groups and said first one of said subsets of said documents, for those of said keywords retained in said main memory, and releasing said main memory;

computer readable program code configured to repeat said determining, comparing, respective retaining or ignoring, and building and writing steps for all remaining ones of said keyword groups in said first one of said subsets of said documents, and for all of said keyword groups in all remaining ones of said subsets of said documents, to obtain remaining ones of said set of first partial index files;

computer readable program code configured to merge each of said first partial index files corresponding to a given one of said keyword groups into one of a plurality of second partial index files, one for each of said keyword groups;

computer readable program code configured to merge said plurality of second partial index files into said overall index for said database; and computer readable program code configured to store said overall index in said persistent storage unit of said computer.

8. The article of manufacture according to claim 7, wherein the individual documents and the keywords of the database are provided with document identifiers and keyword identifiers, respectively, each of the document identifiers and of the keyword identifiers being unique throughout the database.

9. The article of manufacture according to claim 8, wherein each of the first partial index files includes a Keyword to Document index having a pointer from one of the keyword identifiers to one or more of the corresponding document identifiers.

10. The article of manufacture according to claim 8, wherein each of the first partial index files includes a Document to Keyword index having a pointer from one of the document identifiers to one or more of the corresponding keyword identifiers.

11. The article of manufacture according to claim 8, further comprising computer readable program code configured to cause a computer to execute the additional steps:

creating keyword indices each indicating a correspondence of a given keyword and a corresponding one of the keyword identifiers, and writing the keyword indices in the persistent storage unit of said computer.

12. The article of manufacture according to claim 11, wherein the keyword indices are sequentially written one by one as a single keyword index file, corresponding to the database, for each of the keyword groups, by sequentially reading out the individual documents of the document subsets.

13. A system for creating an overall index for a database having:

a plurality of documents, each of said documents being associated with one or more keywords, and a number of keyword groups, designated as G, G comprising a fixed integer value, said system comprising:

a persistent storage device;

a main memory;

means for dividing said database into a plurality of subsets of said documents;

means for, for a first one of said keyword groups and for each one of said documents in a first one of said subsets of said documents, for each given one of said keywords in a given one of said documents in said first one of said subsets of said documents:

determining a remainder, h, when a hash function is applied to said given one of said keywords and a result of said hash function is divided by G, said hash function returning an integer value;

comparing said remainder, h, to a corresponding value for said first one of said keyword groups;

if said remainder, h, matches said corresponding value for said first one of said keyword groups, retaining said given one of said keywords in said main memory; and if said remainder, h, does not match said corresponding value for said first one of said keyword groups, ignoring said given one of said keywords;

means for building and writing to said persistent storage device one of a set of first partial index files, corresponding to said first one of said keyword groups and said first one of said subsets of said documents, for those of said keywords retained in said main memory, and releasing said main memory;

means for repeating said determining, comparing, respective retaining or ignoring, and building and writing steps for all remaining ones of said keyword groups in said first one of said subsets of said documents, and for all of said keyword groups in all remaining ones of said subsets of said documents, to obtain remaining ones of said set of first partial index files;

means for merging each of said first partial index files corresponding to a given one of said keyword groups into one of a plurality of second partial index files, one for each of said keyword groups;

means for merging said plurality of second partial index files into said overall index for said database; and means for storing said overall index in said persistent storage device.

14. The system according to claim 13, wherein the individual documents and the keywords of the database are provided with document identifiers and keyword identifiers, respectively, each of the document identifiers and of the keyword identifiers being unique throughout the database.

15. The system according to claim 14, wherein each of the first partial index files includes a Keyword to Document index having a pointer from one of the key word identifiers to one or more of the corresponding document identifiers.

16. The system according to claim 14, wherein each of the first partial index files includes a Document to Keyword index having a pointer from one of the document identifiers to one or more of the corresponding keyword identifiers.

17. The system according to claim 14, further comprising:
   means for creating keyword indices each indicating a correspondence of a given keyword and a corresponding one of the keyword identifiers, and
   means for writing the keyword indices in the persistent storage device.

* * * * *